Oct. 29, 1935.    J. L. POTTER    2,018,923
RESILIENT ATTACHMENT FOR HANDLES
Filed Sept. 29, 1934
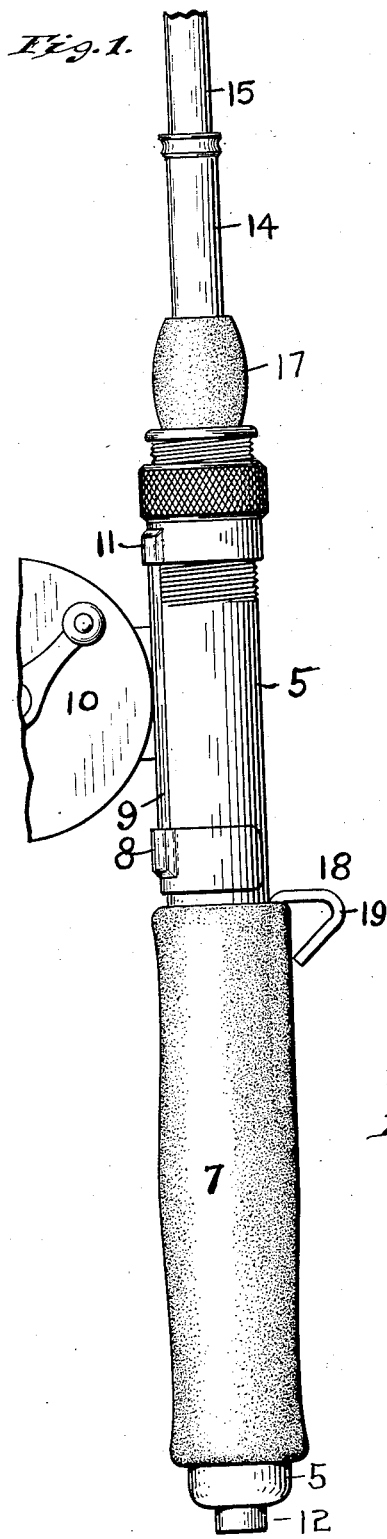
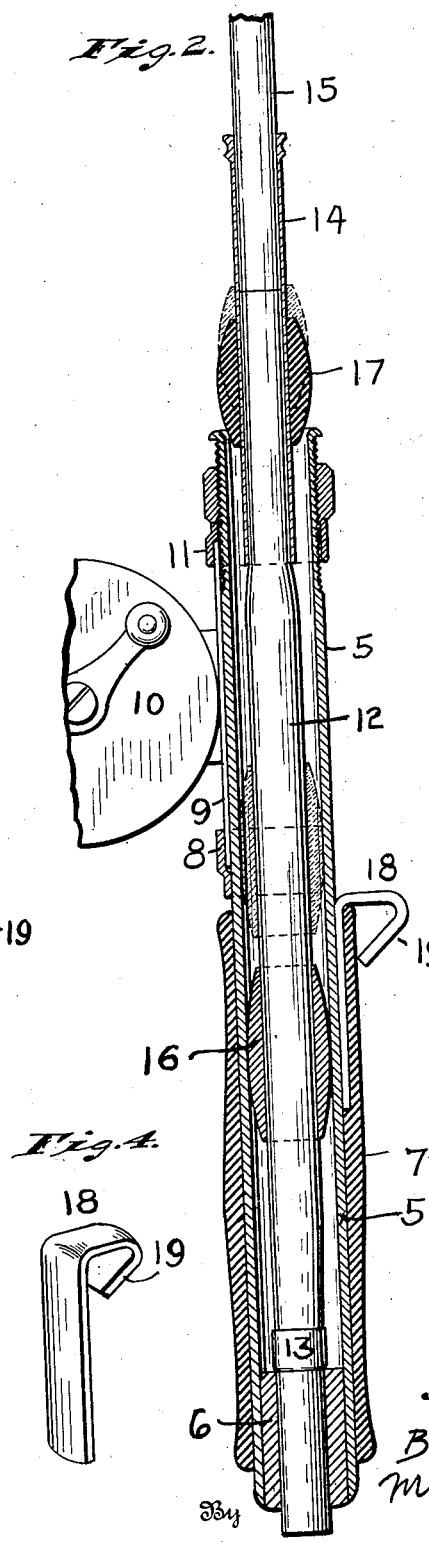
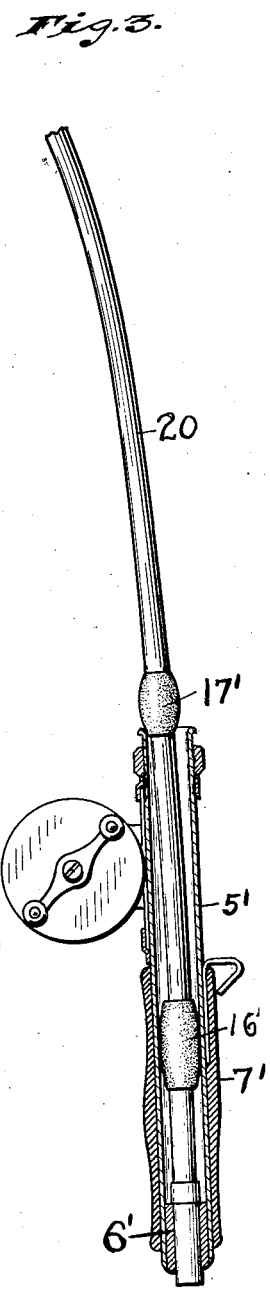
Inventor
JOSEPH L. POTTER,
By Minturn & Minturn
Attorney Patented Oct. 29, 1935

2,018,923

UNITED STATES PATENT OFFICE 2,018,923

RESILIENT ATTACHMENT FOR HANDLES

Joseph L. Potter, Indianapolis, Ind.

Application September 29, 1934, Serial No. 746,161

10 Claims. (Cl. 43—23)

The object of this invention is to provide a rod with a hand-hold by which the rod may be rigidly held in and by the hand-hold or by which the rod may be held with a lateral or swinging movement in the hand-hold subject to adjustment and control by the person using the device. It is applicable for golf clubs, fishing poles and articles for other uses.

Another object is to provide a hand-grip which is placed or removed at will.

I accomplish the above principal object and other minor ones which will hereinafter appear, by the means illustrated in the accompanying drawing, in which, by way of illustration, the invention is applied to a fishing rod, and in which drawing—

Fig. 1 is a view in side elevation of a hand-hold with reel and connection for a jointed rod;

Fig. 2 is a longitudinal section of the assembly shown in Fig. 1;

Fig. 3 is a modification in longitudinal section showing a one-piece rod instead of a jointed one, and Fig. 4 is a perspective view of a hand grip removed from its operative parts.

Like characters of reference indicate like parts in the several views of the drawing. As stated the invention is applied to a fishing rod only by way of illustration, and may be used for other purposes.

A metal tube 5 has a sleeve bushing 6 fixed on its outer end and has outside screw threads at its other or inner end. Mounted on the outside of the tube next to its outer end is a hand-hold 7 of cork, wood or any desirable and suitable material.

Brazed or otherwise fixed to the tube 5, above the hand-hold 7, is a band having a pocket 8 to receive one end of the plate 9 of a reel 10, and screwed on the threaded end of the tube is a milled nut having a pocket 11 similar to pocket 8, to receive the other end of the reel plate 9.

Seated in the hollow of the bushing 6 is a core-rod 12, which preferably has a band 13 fixed on it as a stop to limit the insertion of the rod in the bushing and to provide an end thrust bearing for the core-rod.

It will be noted that the end of the rod 12 projects for an appreciable distance beyond the outer end of the bushing 6, the purpose of which projection is to enable the rod 12 to be moved inwardly of the handle by the application of pressure against the projecting end, or by tapping it in case the rod is stuck by expansion. The removal of the rod is desirable for the convenient adjustment on it of the knob 16; also for moving the rod to move the knob 17 out of contact with the end of tube 5.

The outer end of the core-rod is preferably sufficiently reduced in diameter to form a stop at the right distance from the end to arrest a sleeve 14 which is slidably fitted on the reduced end of the core-rod. The sleeve 14 extends far enough beyond the core-rod to provide a socket to receive and firmly hold the first section 15 of a jointed fishing rod.

Mounted on the core-rod 12 is a knob 16, of elastic rubber, or other suitable resilient material, the widest portion of which makes a snug sliding fit against the inside walls of the tube 5. As shown in dotted lines in Fig. 2, this knob is slidably adjustable on the tube from the band 13 to the sleeve 14. Its function is to normally hold the core-rod 12 parallel with the tube 5, while also allowing a lateral swinging movement of the rod in the tube by reason of the compressibility of the elastic knob. The position of the knob in the tube 5 determines the amount of lateral movement of the core-rod in the tube, as, by moving the knob toward the top of the tube, the lateral movement of the core-rod is reduced.

Mounted slidably upon the sleeve 14 is a second knob 17, of rubber or any other suitable material even though not elastic, which is normally in the position shown by the dotted lines giving free swinging movement to the core-rod, and which is pushed down into the mouth of the bore of tube 5, to contact the latter and prevent lateral movement of the core-rod.

To give the operator's hand a firmer grip on the handle I provide a hand grip 18, which is a metal strap curved to the outside curvature of the tube 5 and is removably secured by sliding it between the tube and grip 7 as clearly shown in Figs. 2 and 3.

The outer end of the metal strap is bent out at right angles and then back on a curve instead of a sharp angle at the bend and is continued in an oblique leg 19, just far enough to about contact the grip 7. This forms a lug-like projection or grip for the hand of the operator. It is made removable at the will of the user when not required.

In the modification shown in Fig. 3, a continuous rod 20, instead of a jointed one is used, and this is extended to and has its end seated in the bushing 6'.

The sliding knobs 16' and 17' are the same in construction and purpose as the knobs 16 and 17, previously described.

What I claim is:

1. A handle having a longtiudinal socket and a hollow bushing at the bottom of the socket, in combination with a rod much smaller in diameter than the diameter of the socket to allow lateral movement of the rod, said rod being seated in the hollow of the bushing to swingingly move thereabout, and a knob mounted on and adjustable longitudinally of the rod to vary the swinging movement of the rod.

2. A handle having a longitudinal socket and a hollow bushing at the bottom of the socket, in combination with a rod much smaller in diameter than the diameter of the socket to allow lateral movement of the rod, said rod being seated in the hollow of the bushing to swingingly move thereabout, and a knob of elastic material mounted on and adjustable longitudinally of the rod to vary the swinging movement of the rod.

3. A handle having a longitudinal socket and a hollow bushing at the bottom of the socket, in combination with a rod much smaller in diameter than the diameter of the socket to allow lateral movement of the rod, said rod being seated in the hollow of the bushing to swingingly move thereabout, and a knob of elastic material mounted on and adjustable longitudinally of the rod to vary the swinging movement of the rod, said knob filling the space between the rod and handle socket.

4. A tube, a hand-hold on the outside of the tube at one end, a hollow bushing in the tube at the hand-hold end, a core-rod in the tube seated in the hollow bushing and smaller in diameter than the bore of the tube to provide a swinging adjustment of the rod in the tube, and a knob of elastic material mounted on the rod in the tube and extending for part of its length from the rod to the wall of the tube and adjustable longitudinally on the rod.

5. A tube, a hand-hold on the outside of the tube at one end, a hollow bushing in the tube at the hand-hold end, a core-rod in the tube seated in the hollow bushing and smaller in diameter than the bore of the tube to provide a swinging adjustment of the rod in the tube, and a knob of elastic material mounted on the rod in the tube and extending for part of its length from the rod to the wall of the tube and adjustable longitudinally on the rod, and a knob on the rod outside of the tube adjustable against and away from the mouth of the tube.

6. A tube, a hand-hold on the outside of the tube at one end, a hollow bushing in the tube at the hand-hold end, a core-rod in the tube seated in the hollow bushing and smaller in diameter than the bore of the tube to provide a swinging adjustment of the rod in the tube, and a knob of elastic material mounted on the rod in the tube and extending for part of its length from the rod to the wall of the tube and adjustable longitudinally on the rod, and a hand grip projecting beyond the hand-hold having a shank which is removably inserted between the tube and the hold-hold.

7. A tube, a hand-hold on the outside of the tube at one end, a hollow bushing in the tube at the hand-hold end, a core-rod in the tube seated in the hollow bushing and smaller in diameter than the bore of the tube to provide a swinging adjustment of the rod in the tube, and a knob on the rod outside of the tube adjustable against and away from the mouth of the tube.

8. A tube, a hand-hold on the outside of the tube at one end, a hollow bushing in the tube at the hand-hold end, and a core-rod in the tube seated in the hollow bushing and smaller in diameter than the bore of the tube to provide a swinging adjustment of the rod in the tube, the end of said core-rod extending through the bushing for direct access outside of the tube to that end of the rod.

9. A tube, a hand-hold on the outside of the tube at one end, a hollow bushing in the tube at the hand-hold end, a core-rod in the tube seated in the hollow bushing and smaller in diameter than the bore of the tube to provide a swinging adjustment of the rod in the tube, the end of said core-rod extending through the bushing for direct access outside of the tube to that end of the rod, and a knob of elastic material mounted on the rod in the tube and extending for part of its length from the rod to the wall of the tube and adjustable longitudinally on the rod.

10. A tube, a hand-hold on the outside of the tube at one end, a hollow bushing in the tube at the hand-hold end, a core-rod in the tube seated in the hollow bushing and smaller in diameter than the bore of the tube to provide a swinging adjustment of the rod in the tube, the end of said core-rod extending through the bushing for direct access outside of the tube to that end of the rod, a knob of elastic material mounted on the rod in the tube and extending for part of its length from the rod to the wall of the tube and adjustable longitudinally on the rod, and a knob on the rod outside of the tube adjustable against and away from the mouth of the tube.

JOSEPH L. POTTER.